(12) United States Patent
Chen

(10) Patent No.: US 6,533,093 B2
(45) Date of Patent: Mar. 18, 2003

(54) TORQUE ADJUSTING DEVICE FOR A DRILL

(75) Inventor: Ting-Kuang Chen, Keelung (TW)

(73) Assignee: Power Network Industry Co., Ltd., Taipei (TW)

( * ) Notice: Subject to any disclaimer, the term of this patent is extended or adjusted under 35 U.S.C. 154(b) by 14 days.

(21) Appl. No.: 09/838,960

(22) Filed: Apr. 19, 2001

(65) Prior Publication Data

US 2002/0153219 A1 Oct. 24, 2002

(51) Int. Cl.[7] ............... B23B 45/00; F16D 43/20
(52) U.S. Cl. ................ 192/56.62; 192/56.61; 192/110 R; 192/150; 81/58.3
(58) Field of Search .............. 192/56.61, 56.62, 192/69.61, 3.52, 114 R, 110 R, 150; 81/58.3, 58.4, 475; 408/139; 173/178

(56) References Cited

U.S. PATENT DOCUMENTS

| | | | | |
|---|---|---|---|---|
| 3,752,278 A | * | 8/1973 | States | 173/178 |
| 3,754,412 A | * | 8/1973 | Briggs | 192/56.62 |
| 5,277,527 A | * | 1/1994 | Yokota et al. | 408/139 |
| 5,738,469 A | * | 4/1998 | Hsu | 408/139 |
| 6,010,426 A | * | 1/2000 | Nakamura | 192/56.62 |
| 6,305,481 B1 | * | 10/2001 | Yamazaki et al. | 173/178 |

FOREIGN PATENT DOCUMENTS

GB     2 334 910      8/1999

* cited by examiner

*Primary Examiner*—Rodney H. Bonck

(57) ABSTRACT

A torque adjusting device of an electric drill includes an annular member with notches in an end and grooves in an outer periphery thereof. A driving part connected to an output shaft is received in the annular member and operationally connected to the motor by a solar gear system. A mounting member has pins located in alignment with the grooves and a cap has a ring member movably mounted to the mounting member. A spring is biased between the ring member and the pressing ring which presses balls engaged with the notches. when the ring member is moved to compress the spring, the pins are pushed into the grooves by the ring member to secure the annular member so as to output strong torque.

1 Claim, 5 Drawing Sheets

US 6,533,093 B2

TORQUE ADJUSTING DEVICE FOR A DRILL

FIELD OF THE INVENTION

The present invention relates to an electric drill that has a torque adjusting device which allows the output of strong torque.

BACKGROUND OF THE INVENTION

A conventional torque adjusting device for an electric drill is shown in FIGS. 1 and 2 and generally includes a motor 1 which has a driving shaft 100 which is engaged with a solar gear system 21 which is composed of three gears 210. The three gears 210 are engaged with an inner toothed periphery 230 of a ring member 23 and a driving part 220 having three rods respectively extending through the three gears 210. The ring member 23 has notches 230 defined in an end thereof and a casing 20 is mounted to the driving part 220. The casing 20 has a tube 24 through which the output shaft 4 extends and the output shaft 4 is securely engaged with the driving part 220. The casing 20 has an annular arranged holes 200 and each hole has a ball 22 received therein which is also engaged with one of the notches 230 of the ring member 23. The casing 20 is received in an adjusting cone 3 which has a spirally stepped shoulder 31 defined in an inner periphery thereof and a compressing ring 32 is engaged with the shoulders 31. A spring 30 is mounted to the tube 24 and the compressing ring 32 and a press ring 33 are respectively located on two ends of the spring 30 wherein the pressing ring 33 seals the holes 200 in the casing 20. As shown in FIG. 3, when the cone 3 is rotated to let a wider portion of the shoulder 31 contact the compressing ring 32 and compresses the spring 30, the balls 22 are securely engaged with the notches 230 so that the ring member 23 is not rotated by the compression force of the balls 22 and the output shaft 4 transforms the torque of the motor 1. When rotating the cone 3 to let a narrower portion of the shoulder 31 contact the compressing ring 32, the spring 30 is applied a smaller force and the balls 22 apply a small force to the ring member 23 so that the ring member 23 can be rotated. Therefore, when the ring member 23 is rotated and the balls 22 are not located in the notches 230, the driving part 220 is not rotated and only the gears 210 rotate about the respective rods. The output shaft 4 at this moment when the balls 22 are not located in the notches outputs the least torque. However, the spring 30 has its largest deformation limitation so that it is difficult to compress the balls 22 to a desired level and this is the reason why the conventional torque adjusting device cannot completely transform the torque of the motor to the output shaft 4.

SUMMARY OF THE INVENTION

In accordance with one aspect of the present invention, there is provided a torque adjusting device and comprising a driving part having a plurality of rods and each rod has a gear rotatably mounted thereto. The gears are engaged with a motor's driving shaft and the driving part is received in an annular member which has a toothed inner periphery engaged with the gears, a plurality of grooves defined longitudinally in an outer periphery of the annular member and a plurality of notches defined in an end of the annular member. A mounting member has a plurality of first passages which are located in alignment with the notches and a ball is received in each of the first passages and engaged with one of the notches. A plurality of second passages are defined through the mounting member and located in alignment with the grooves. Each of second passages has a pin movably received therein and the mounting member has a threaded tube.

An adjusting cap is mounted to the threaded tube and a ring member is fixedly connected to an inside of the cap. The ring member is threadedly mounted to the threaded tube. A first end of a spring is engaged with the ring member and a second of the spring contacts a pressing ring which compresses the balls to engage with the notches. The ring member has contacting parts which push the pins into the grooves when the spring is compressed. An output shaft has an end fixedly connected to the driving part and the other end of the output shaft extends through the threaded tube and the adjusting cap.

The primary object of the present invention is to provide a torque adjusting device for an electric drill wherein the device has pins to be engaged with longitudinal grooves in the annular member so as to output a large torque.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 4:
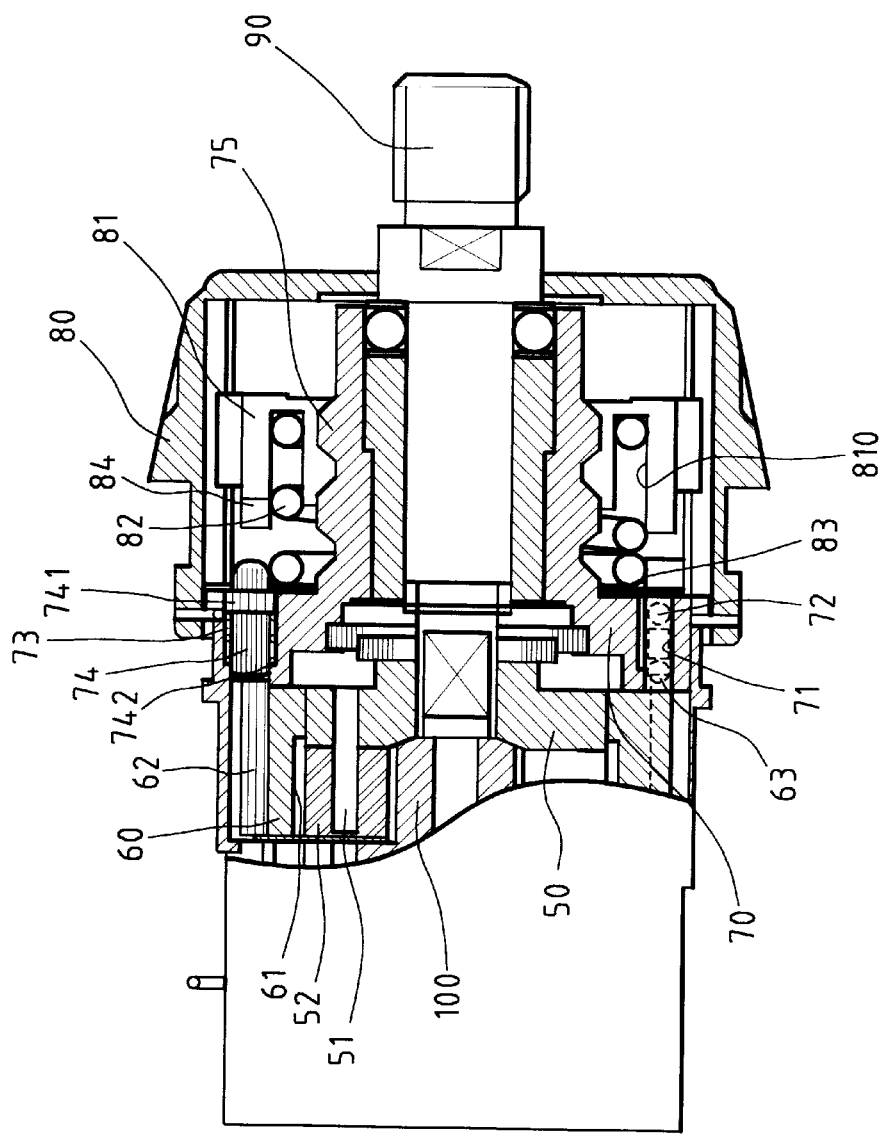
FIG. 4 is a cross sectional view to show the torque adjusting device of the present invention.

Referring to FIG. 4, the torque adjusting device of the present invention comprises a driving part 50 which has a plurality of rods 51 and each rod 51 has a gear 52 rotatably mounted thereto to form a solar gear system. The gears 52 are engaged with a motor's driving shaft 100. An annular member 60 is mounted to the driving part 50 and has a toothed inner periphery 61 which is engaged with the gears 52. A plurality of grooves are defined longitudinally in an outer periphery of the annular member 60 and a plurality of notches 63 are defined in an end of the annular member 60.

A mounting member 70 has a plurality of first passages 71 which are located in alignment with the notches 63, and each of the first passages 71 has a ball 72 received therein which is engaged with one of the notches 63. A plurality of second passages 73 are defined through the mounting member 70 and located in alignment with the grooves 62. Each of second passages 73 has a pin 74 movably received therein and each of the pins 74 has a flange 741. A spring 742 is mounted to each of the pins 74 and biased between the flange 741 and an inner side of the second passage 73. The mounting member 70 has a threaded tube 75.

An adjusting cap 80 is mounted to the threaded tube 75 and a ring member 81 is fixedly connected to an inside of the cap 80. The ring member 81 is threadedly mounted to the threaded tube 75 and a first end of a spring 82 is received in an annular groove 810 in the ring member 81, a second end of the spring 82 contacting a pressing ring 83 which compresses the balls 72 to engage with the notches 63 in the annular member 60. The ring member 81 has contacting parts 84 which push the pins 74 into the grooves 62 when the spring 82 is compressed. An output shaft 90 has an end fixedly connected to the driving part 50 and the other end of the output shaft 90 extends through the threaded tube 75 and the adjusting cap 80.

Figure 1:
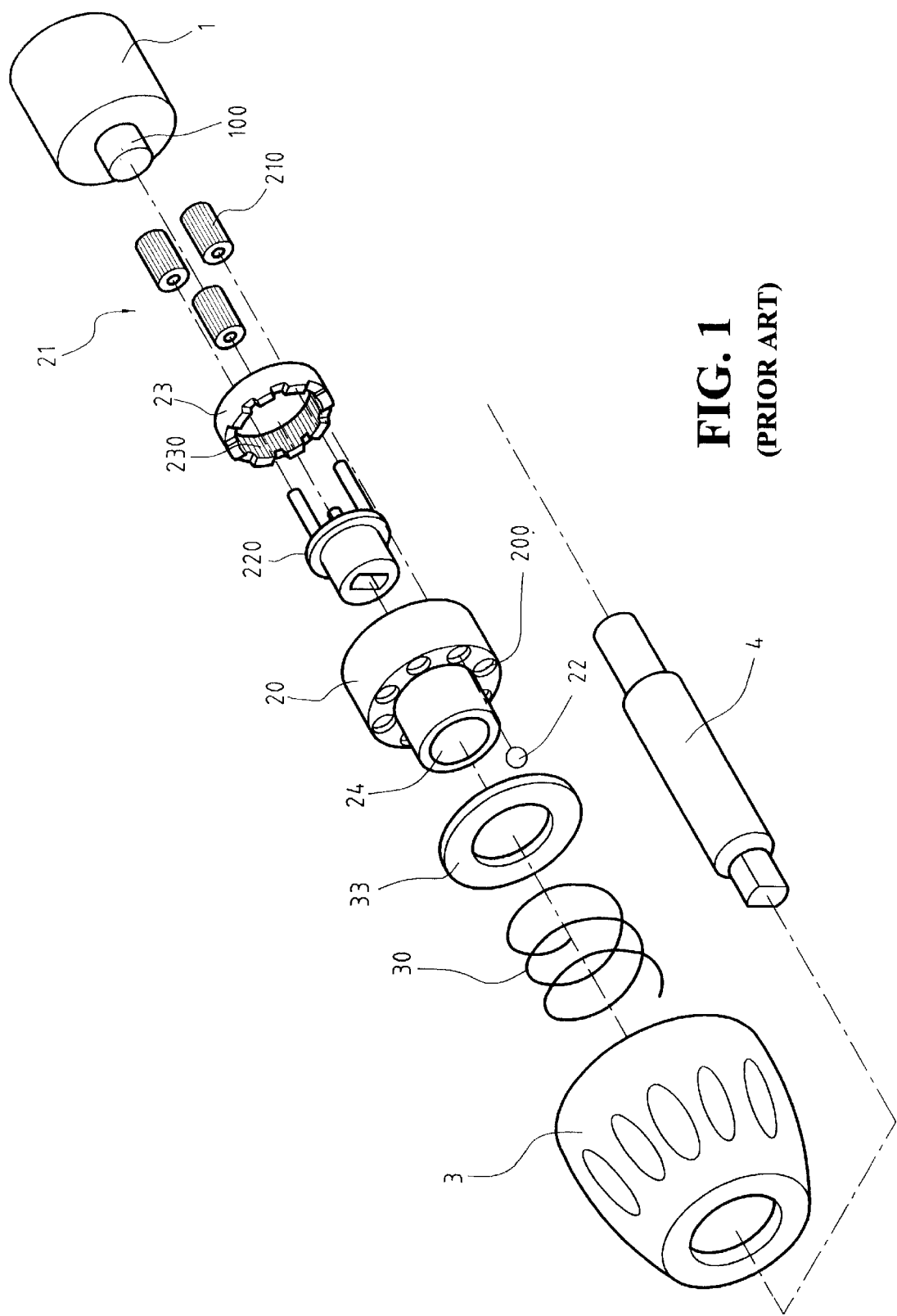
FIG. 1 is an exploded view to show a conventional torque adjusting device for an electric drill.
Figure 2:
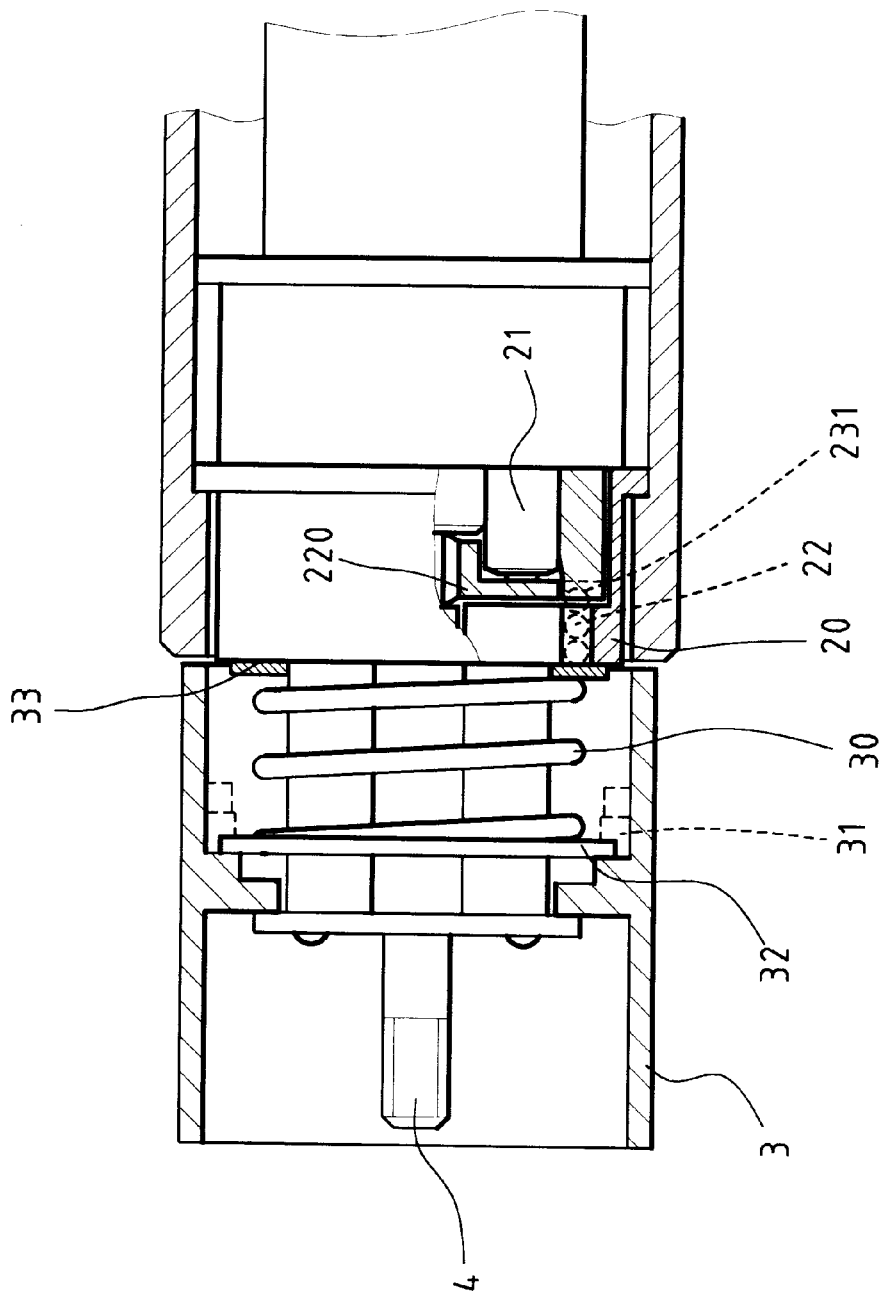
FIG. 2 is a cross sectional view to show the conventional torque adjusting device.
Figure 3:
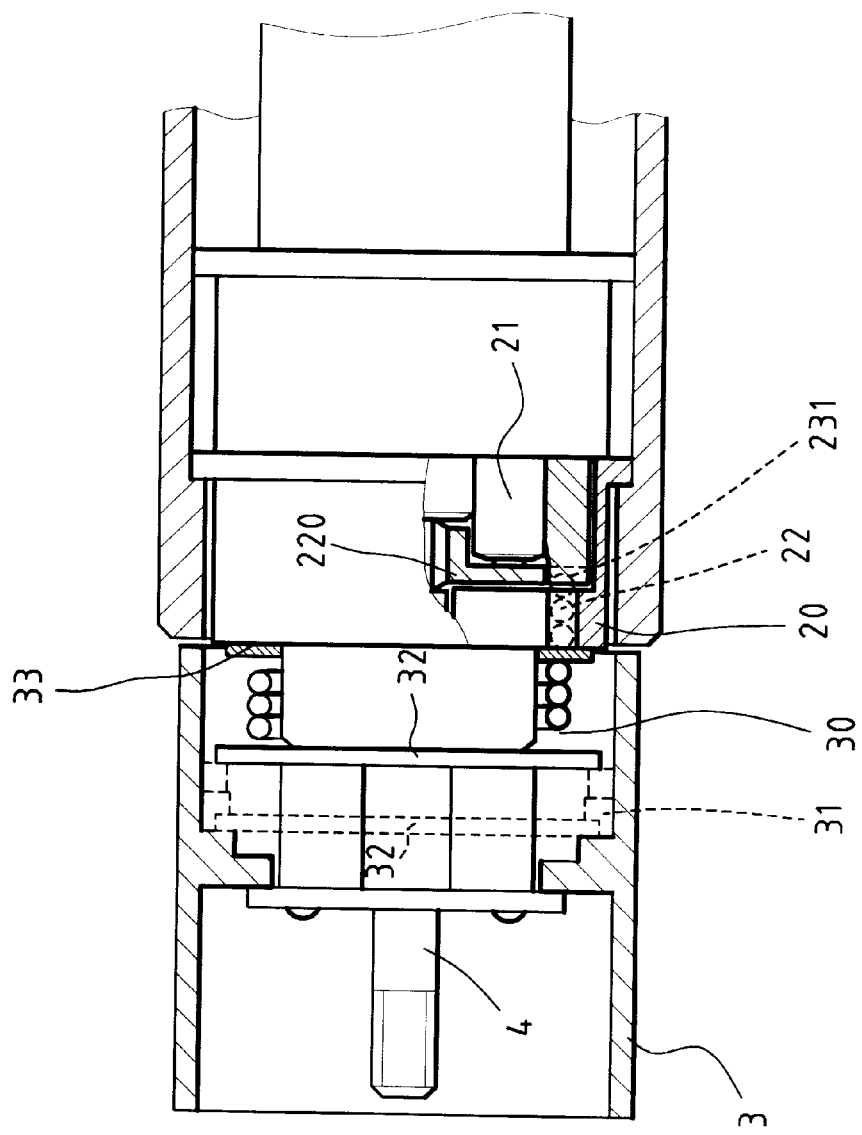
FIG. 3 is a cross sectional view to show the conventional torque adjusting device wherein the adjusting cone is rotated and the spring is compressed.
Figure 5:
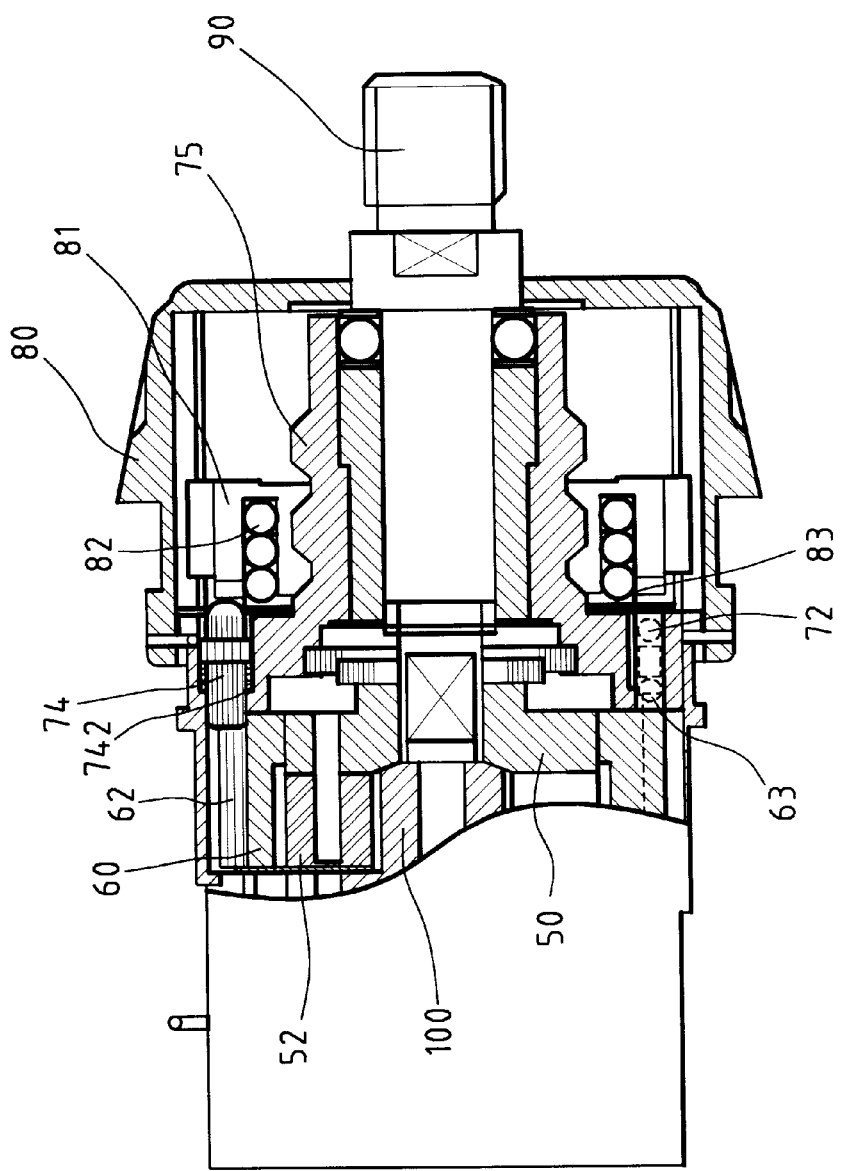
FIG. 5 is a cross sectional view to show the torque adjusting device of the present invention wherein the adjusting cap is rotated and the spring is compressed.

As shown in FIG. 5, when rotating the adjusting cap 80, the ring member 81 is moved along the threaded tube 75 and compresses the spring 82 to securely push the balls 72 to engage the notches 63. The contacting parts 84 are moved toward the pins 74 together with the adjusting cap 80 to push the pins 74 into the grooves 62. The engagement between the pins 74 and the grooves 62 in the annular member 60 assures that the annular member 60 cannot rotate as the ring member 23 in the conventional device as shown in FIGS. 1 to 3 so that the output shaft 90 may output strong torque.

While we have shown and described one embodiment in accordance with the present invention, it should be clear to those skilled in the art that further embodiments may be made without departing from the scope of the present invention.

What is claimed is:

1. A torque adjusting device comprising:

a driving part having a plurality of rods and each rod having a gear rotatably mounted thereto, said gears adapted to be engaged with a motor's driving shaft;

an annular member mounted to said driving part and having a toothed inner periphery which is engaged with said gears, a plurality of grooves defined longitudinally in an outer periphery of said annular member and a plurality of notches defined in an end of said annular member;

a mounting member having a plurality of first passages which arc located in alignment with said notches, a ball received in each of said first passages and engaged with one of said notches, a plurality of second passages defined through said mounting member and located in alignment with said grooves, each of second passages having a pin movably received therein, said mounting member having a threaded tube;

an adjusting cap mounted to said threaded tube and a ring member fixedly connected to an inside of said cap, said ring member threadedly mounted to said threaded tube and a first end of a spring engaged with said ring member, a second end of said spring contacting a pressing ring which compresses said balls to engage with said notches in said annular member, said ring member having contacting parts which push said pins into said grooves when said spring is compressed, and an output shaft having an end fixedly connected to said driving part and the other end of said output shaft extending through said threaded tube and said adjusting cap;

wherein each of said pins has a flange formed thereon and a spring mounted and biased between said flange and an inner side of a second passage.

* * * * *